(12) United States Patent
Sato et al.

(10) Patent No.: US 6,782,376 B2
(45) Date of Patent: Aug. 24, 2004

(54) REASONING METHOD BASED ON SIMILARITY OF CASES

(75) Inventors: Yoshinori Sato, Yokohama (JP); Toyohisa Morita, Sagamihara (JP); Yukiyasu Ito, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 546 days.

(21) Appl. No.: 09/755,138

(22) Filed: Jan. 8, 2001

(65) Prior Publication Data

US 2001/0054033 A1 Dec. 20, 2001

(30) Foreign Application Priority Data

May 18, 2000 (JP) ........................................ 2000-152668

(51) Int. Cl.[7] .............................................. G06F 17/00
(52) U.S. Cl. .............................. 706/47; 706/45; 706/48
(58) Field of Search ............................. 706/47, 46, 45, 706/21, 19, 2, 6, 8, 48

(56) References Cited

U.S. PATENT DOCUMENTS

| | | | | | |
|---|---|---|---|---|---|
| 5,581,664 | A | * | 12/1996 | Allen et al. ................... | 706/46 |
| 5,701,400 | A | * | 12/1997 | Amado ......................... | 706/45 |
| 5,950,182 | A | * | 9/1999 | Godbole et al. ............... | 706/45 |
| 6,418,425 | B1 | * | 7/2002 | Maeda et al. ................. | 706/47 |
| 6,477,538 | B2 | * | 11/2002 | Yaginuma et al. ........... | 707/102 |
| 6,571,251 | B1 | * | 5/2003 | Koski et al. ................. | 707/102 |

FOREIGN PATENT DOCUMENTS

| | | | | |
|---|---|---|---|---|
| JP | 2632117 | | 4/1997 | ............. G06F/9/44 |

OTHER PUBLICATIONS

Khoshgoftarr et al., "Predicting Fault–Prone Modules with Case–Based Reasoning", Proceedings of the 8th International Symposium on Software Reliability Engineering, Nov. 1997, pp. 27–35.*

Nomoto et al., "Similarity Measures Using Fuzzy Thesauri for Case–Based Reasoning", 1999 IEEE International Conference on Systems, man and Cybernetics, Oct. 1999, vol. 3, pp. 68–72.*

Gebhardt et al., "On a Tool for Possibilistic Reasoning in Relational Structures", Proceedings of the 5th IEEE International Conference on Fuzzy Systems, Sep. 1996, vol. 2, pp. 1471–1475.*

Holt et al., "Case–Based Reasoning With Spatial Data", Proceedings of the 2nd New Zealand International Two–Stream Conference on Artificial Neural Networks and Expert Systems, Nov. 1995, pp. 385–388.*

Sudkamp, T., "Similarity as a Foundation for Possibility", 9th IEEE International Conference on Fuzzy Systems, May 2000, vol. pp. 735–740.*

Sun et al., "Intergration of Abductive CBR and Deductive CBR", 10th IEEE International Conference on Fuzzy Systems, Dec. 2001, vol. 3, pp. 1432–1435.*

De et al., "Case–Based Classification Using Fuzziness and Neural Networks", IEE Colloquium on Knowledge Discovery and Data Mining (Digest No. 1998/310), May 1998, pp. 6/1–6/3.*

(List continued on next page.)

*Primary Examiner*—Wilbert L. Starks, Jr.
*Assistant Examiner*—Kelvin Booker
(74) *Attorney, Agent, or Firm*—Mattingly, Stanger & Malur, P.C.

(57) ABSTRACT

A reasoning method for determining similar cases by executing a case-similarity calculation step and utilizing a distribution of values of fields for calculation of reasoning results of cases having high similarities. Since the similar cases are determined taking a peripheral distribution of a new case into consideration, suitable similar cases can be selected for reasoning even when the case distribution is not uniform.

9 Claims, 11 Drawing Sheets

OTHER PUBLICATIONS

Hirota et al., "A Fuzzy Case Based Reasoning System for The Legal Inference", Proceedings of the 1998 IEEE Intl Conference on Fuzzy Systems, May 1998, vol. 2, pp. 1350–1354.*

Dvir et al., "Matching Attributes in a Fuzzy Case Based Reasoning", $18^{th}$ Intl Conference of the North American Fuzzy Information Processing Society, Jun. 1999, pp. 33–36.*

Fathi–Torbaghan et al., "ICARUS: Integrated Rule–Based and Case–Based Reasoning on the Base of Unsharp Symptoms", IEEE Intl Conference on Systems, Man and Cybernetics, Oct. 1995, vol. 3, pp. 2424–2427.*

Atiquzzaman et al., "Systolic Array Implementation for Fuzzy Evidential Reasoning Systems", Proceedings of the Intl Conference on Expert Systems for Development, Mar. 1994, pp. 91–96.*

Nakanishi et al., "A Comparison of Direct Fuzzy Reasoning Methods", Proceedings of the 1995 IEEE Intl Conference on Fuzzy Systems, Mar. 1995, vol. 4, pp. 1927–1933.*

Wang et al., "Mining Approximate Dependency to Answer Null Queries on Similarity–Based Fuzzy Relational Databases", $9^{th}$ International Conference on Fuzzy Systems, May 2000, vol. 2, pp. 615–620.*

Vasudevan et al., "Fuzzy Logic in Case–Based Reasoning", Proceedings of the $1^{st}$ Intl Joint Conference of the North American Fuzzy Information Processing Society Biannual Conference, Dec. 1994, pp. 301–302.*

Baldwin, "Probabilistic, Fuzzy and Evidential Reasoning in FRIL", IEE Colloquium on Two Decades of Fuzzy Control–Part 2, Ma 1993, pp. 7/1–7/4.*

Racine et al., "Maintaining Unstructured Case Bases", Proceedings of the $2^{nd}$ Intl Conference on Case–Based Reasoning, 1997 pp. 553–564.*

Toward Memory–Based Reasoning, Dec. 1986.

* cited by examiner

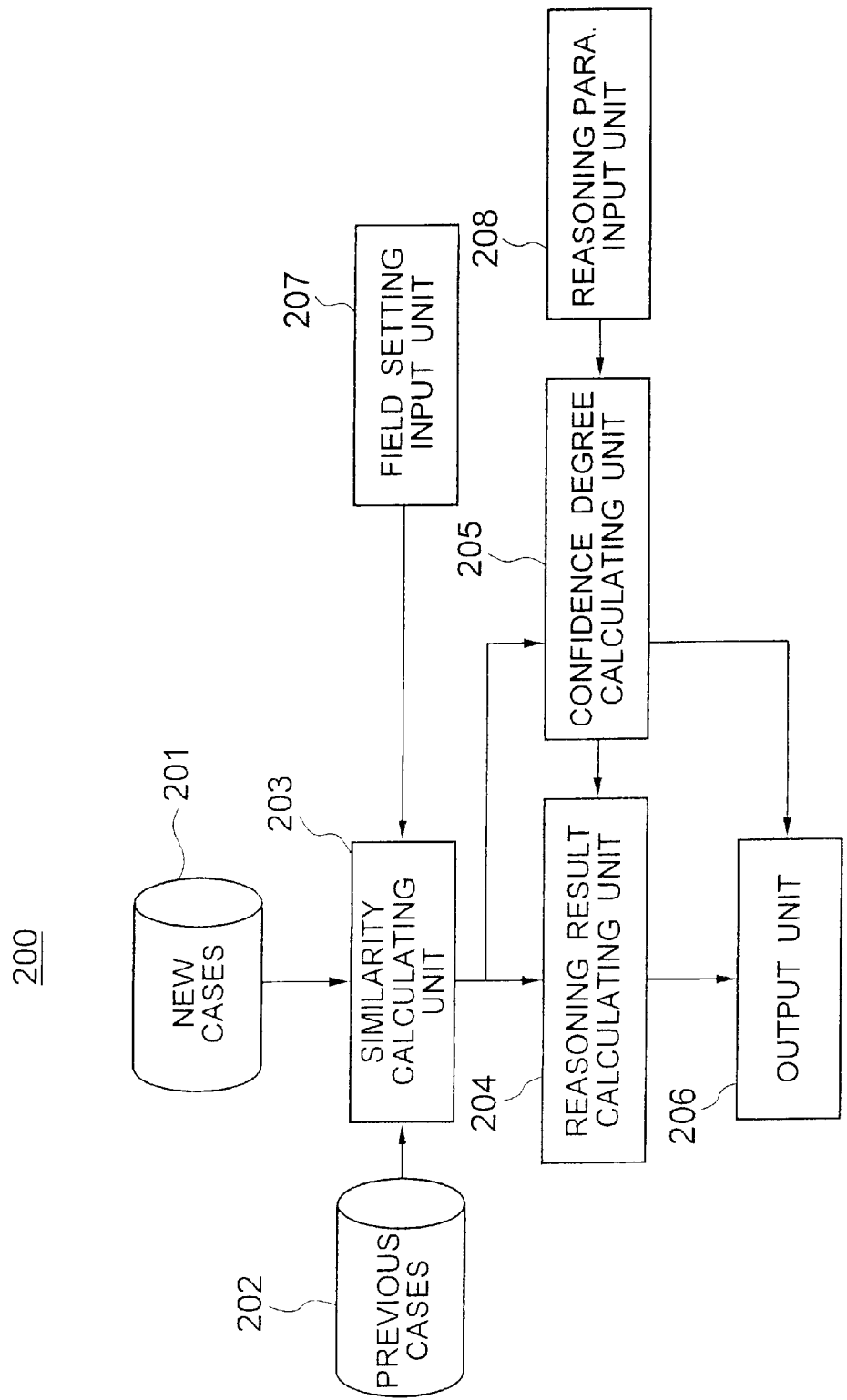

| CASE NO. | ELAPSED DAYS AFTER OPERATION | WEEKDAY | HIGHEST AIR TEMPERATURE | LOWEST AIR TEMPERATURE | HIGHEST WATER TEMPERATURE | LOWEST WATER TEMPERATURE | PREVIOUS-DAY PRODUCTION VOL. | SAME-DAY PRODUCTION VOL. |
|---|---|---|---|---|---|---|---|---|
| 1 | 231 | THU | 23 | 13 | 18 | 14 | 3000 | 4000 |
| 2 | 232 | FRI | 20 | 11 | 17 | 14 | 4000 | 3500 |
| 3 | 233 | SAT | 23 | 12 | 17 | 15 | 3500 | 3800 |
| ... | ... | ... | ... | ... | ... | ... | ... | ... |

← N →

302

| ELAPSED DAYS AFTER OPERATION | WEEKDAY | HIGHEST AIR TEMPERATURE | LOWEST AIR TEMPERATURE | HIGHEST WATER TEMPERATURE | PREVIOUS-DAY PRODUCTION VOL. |
|---|---|---|---|---|---|
| 1 | 1 | 0.5 | 1 | 1 | 1 |

303

OUTPUT FIELD

| SAME-DAY PRODUCTION VOL. |
|---|
| 1 |

304

| ALLOWABLE ERROR | ALLOWABLE CONFIDENCE DEGREE |
|---|---|
| 100 | 10 |

305

| ELAPSED DAYS AFTER OPERATION | WEEKDAY | HIGHEST AIR TEMPERATURE | LOWEST AIR TEMPERATURE | HIGHEST WATER TEMPERATURE | LOWEST WATER TEMPERATURE | PREVIOUS-DAY PRODUCTION VOL. | SAME-DAY PRODUCTION VOL. |
|---|---|---|---|---|---|---|---|
| 300 | THU | 23 | 13 | 18 | 14 | 3000 | — |

306

| NO. OF SIMILAR CASES | ALLOWABLE ERROR | ALLOWABLE CONFIDENCE DEGREE |
|---|---|---|
| 20 | 100 | 0.8 |

| SAME-DAY PRODUCTION VOL. | CONFIDENCE DEGREE |
|---|---|
| 3500 | 15 |

401

| SAME-DAY PRODUCTION VOL. | CONFIDENCE DEGREE |
|---|---|
| 3500 | 0.9 |

402

| THIS-TIME PURCHASE ITEM | CONFIDENCE DEGREE |
|---|---|
| CATEGORY 1 | 0.8 |

| SIMILARITY | OUTPUT FIELD VALUE |
|---|---|
| 3.2 | 4000 |
| 2.0 | 3500 |
| 1.0 | 3800 |
| ... | ... |

| | CONDITION-SATISFIED CASE 1200 | CONDITION-UNSATISFIED CASE 1201 |
|---|---|---|
| NO. OF CASES | 100 | 20 |
| AVERAGE CONFIDENCE DEGREE | 13 | 3 |
| AVERAGE ERROR | 30 | 120 |

| REASONING FREQUENCY | ALLOWABLE ERROR | ALLOWABLE CONFIDENCE DEGREE |
|---|---|---|
| 1 | 100 | 10 |
| 2 | 120 | 10 |
| 3 | 140 | 10 |
| 4 | 160 | 10 |
| 5 | 180 | 10 |
| 6 | 180 | 10 |

REASONING METHOD BASED ON SIMILARITY OF CASES

BACKGROUND OF THE INVENTION

The present invention relates reasoning, prediction method, and a system having a reasoning means built therein which uses data involved in a natural phenomenon, such a social phenomenon as vital statistics, such an economic phenomenon as stock price fluctuation, or such chemical and physical phenomenon as industrial plants.

As a technique for effectively utilizing accumulated data, there has been actively studied an analysis technique oriented to a massive amount of data called data mining. The form of data to be extracted varies from application purpose to application purpose, but one of general purposes is reasoning and prediction of new data.

Memory-based reasoning (MBR) is known as a technique for calculating a reasoning result on the basis of similarities from a large amount of accumulated data. The MBR is summarized in a paper entitled "TOWARD MEMORY-BASED REASONING, Communications of the ACM", Craig Stanfill, David Waltz, December 1986, Vol. 29, Number 12, pp. 1213–1228 (which will be referred to as the prior art 1, hereinafter).

In the prior art 1, case data given in the form of record is regarded as vectors, and a similarity between cases is judged on the basis of the magnitude of a distance between the vectors. Cases having large similarities are extracted as similar cases, and output field values of the similar cases are weighed by the distances between the vectors and averaged to calculate a reasoning result.

Another technique associated with the MBR is described, e.g., in Japanese Patent No. 2,632,117. The patent will be called the prior art 2, hereinafter. In the prior art 2 is arranged so that an input space is divided so that an output error is smaller than a threshold value and constructed so that a space defined by input variables is meshed. A case database for use in reasoning is created by embedding (quantizing) cases into the meshed space. A reasoning result of the reasoning error is obtained with use of distances in the meshed space.

The prior art 1 fails to provide means for determining the number of similar cases employed for a new case, and the determination of the number of similar cases is done by a user. In general, when viewed from a vector space, a distribution of cases is not always uniform. Accordingly, it is not always that, only by merely specifying the number of employed cases, suitable similar cases taking the inter-vector distances into consideration can be collected.

The prior art 2 is directed to a technique for use in inferring typical cases obtained by decimating cases. However, when viewed from the entire cases before decimated, the inter-vector distance possessed by similar cases for a new case is determined by a mesh size regardless of a case distribution. Since the mesh size is uniform, however, it is not always that suitable similar cases can be collected for each mesh when the case distribution is not uniform. Further, in such a case, it becomes difficult to suitably calculate a reasoning result of the reasoning error.

SUMMARY OF THE INVENTION

It is therefore an object of the present invention to provide a means for enabling suitable reasoning even when a case distribution is not uniform, which tends to decrease a reasoning accuracy in the prior art, and also to provide a means for calculating a confidence degree with which the validity of a reasoning result can be judged.

In accordance with the present invention, similar cases are determined by executing a step of calculating a similarity of a case and thereafter utilizing a distribution of predictor field values of cases having high similarities. That is, since the similar cases are determined by taking the peripheral distribution of the new case into consideration, suitable similar cases can be selected for reasoning even when the case distribution is not uniform.

In accordance with the present invention, further, a confidence degree is determined by utilizing a distribution of predicator field values of cases having high similarities. Thus even when the case distribution is not uniform, a suitable confidence degree can be calculated.

BRIEF DESCRIPTION OF THE DRAWINGS

FIG. 2 shows data flows between modules to realize a processing method of FIG. 1;

FIG. 3 shows an example of input data;

FIG. 4 shows an example of output data;

FIG. 5 is an example of data processed by a confidence degree calculation module;

FIG. 12 is an example of output data in the fourth embodiment; and

FIG. 13 is an example of input data in the fourth embodiment.

DESCRIPTION OF THE EMBODIMENTS

Terms common to embodiments of the present invention will be defined below. The "case" is expressed in the form of record data, one record consisting of two or more fields. The "previous case" is a case indicative of knowledge used in reasoning, while the "new case" is a case whose at least one field value is unknown. The field having an unknown value is called an output field, while the field having a known value is called an input field.

In the reasoning process in an embodiment of the present invention, the value of an output field of a new case is estimated from the input field of the new case with use of previous cases and is calculated as a reasoning result. A similarity is calculated from a distance between cases and a reasoning result is calculated from the output field values of the calculated similar cases. A distance between new and previous cases is defined by using the values of input fields. For example, when N previous cases having M input fields are present and a relationship between j-th input and output fields in records of the cases is given as weight W(j), a distance D(i) between an i-th previous case I(i) and a new case I' is expressed by an equation which follows.

$$D(i) = \sum_{j=1}^{M} W(j) \cdot (I(i, j) - I'(j))^2 \quad \text{(Equation 1)}$$

where I(i,j) denotes the value of a j-th field in an i-th previous case, i denotes an integer that is not smaller than 0 and is not larger than N, j denotes an integer that is not smaller than 0 and is not larger than M. I'(j) denotes the value of a j-th field in the new case. With respect to a non-numeric type field such as weekday, Monday, Tuesday, Wednesday, . . . are previously converted, e.g., into numeric values of 0, 1, 2, . . .

Similarities of previous cases to a single new case are evaluation value of reasoning results meaning that the larger the reasoning result are the higher the similarities are. A similarity S(i) of an i-th case is expressed by an equation which follows.

$$S(i) = -\frac{D(i)}{\max\{D(j)\}} + 1 \quad \text{(Equation 2)}$$

A reasoning result is obtained by averaging the values of output fields of the similar cases, as given by an equation which follows.

$$Z = \sum_{i \in C} \frac{S(i) \cdot O(i)}{S} \quad \text{(Equation 3)}$$

where O(i) denotes the value of an output field in an i-th previous case, C denotes a set of numbers of previous cases employed as the similar cases, and S denotes a sum of S(i).

Figure 1:
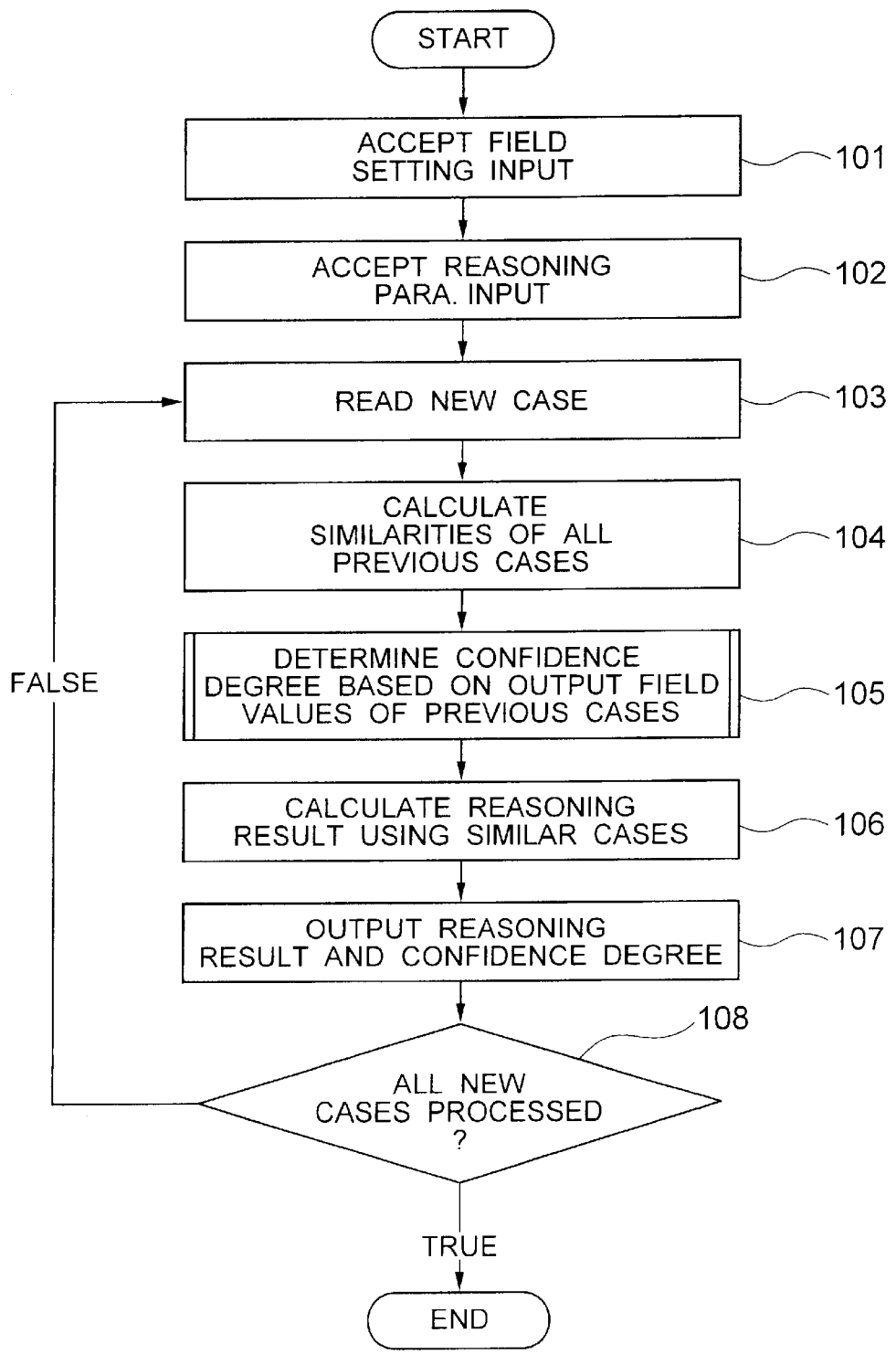
FIG. 1 is a flowchart for explaining a processing procedure of a reasoning method.

A first embodiment will be explained. FIG. 1 shows a flowchart of a reasoning method 100 in the first embodiment. The flowchart of FIG. 1 is executed under control of an ordinary computer. In a step 101, the system accepts a field setting input for use in the reasoning. In a step 102, the system accepts an reasoning parameter input. After completion of the step 102, the system reads in a step 103 a single case to be inferred as a new case. In a step 104, the system determines similarities of previous cases in accordance with the Equation (2). In a step 105, the system determines a confidence degree based on the values of output fields of the similar cases and their similarities. In a step 106, the system determines a reasoning result from the similar cases. In a step 107, the system outputs the confidence degree calculated in the step 105 as well as the reasoning result determined in the step 106.

FIG. 2 shows data flows between modules in a reasoning system 200 in the present embodiment. One or more new cases are stored in a data file 201, and one or more previous cases are stored in the data file 202. The reasoning system includes modules, that is, a similarity calculating unit 203, a reasoning result calculating unit 204, a confidence degree calculating unit 205, an output means output unit 206, a field setting input unit 207 and a reasoning parameter input unit 208.

FIG. 3 shows input data 300 to be processed in the first embodiment. Data 301 is a set of record data indicative of previous cases, wherein the first line indicates field name, the second and subsequent lines denote each one previous case. The data 301 is stored in the data file 202. It is assumed herein that a total number of previous cases stored in the data file 202 is N.

Data 302 and 303 indicate field settings accepted in the step 101. The first line of the data 302 indicates field names used in calculation of a distance between cases, and the second line thereof indicates numeric values indicative of intensity of relationship between the output fields. These numeric values means field weights in the Equation (1). The data 303 indicates an output field.

Data 304 indicates reasoning parameters accepted in the step 102. The data 304 means that a reasoning error (allowable error) of a same-day production volume allowable by a user is set to be not larger than ±100 and a lower limit (allowable confidence degree) of the number of similar cases satisfying the reasoning errors of ±100 or less is set at 10.

In the present embodiment, the number of similar cases satisfying the reasoning errors is called the reasoning confidence degree. The larger the confidence degree is, the more clear the ground, by which the validity of the reasoning result can be accepted, is; and the higher the possibility is that the reasoning result can fall within an allowable error range, when the confidence degree is compared with its true value. Meanwhile, the smaller the confidence degree is the lower the possibility that the reasoning result can fall in the allowable error range.

Data 305 indicates a single new case. In the example of FIG. 3, 'same-day production volume' in the data 305 is an output field and the other fields are input fields.

FIG. 4 shows data 401 as an output 400 of the present embodiment. The data 401 indicates that a reasoning result of the same-day production volume is 3500 and its confidence degree is 15.

Explanation will next be made as to the operation of the present embodiment in accordance with the flowchart of FIG. 1.

The reasoning parameter input unit 208 executes the step 101 to read the data 302 and 303 into the system, sets 'days elapsed after operation', 'weekday', 'highest air temperature', 'lowest air temperature', 'highest water temperature' and 'previous-day production volume' in input fields, and also sets 'same-day production volume' in an output field. A reasoning parameter input unit 209 executes the step 102 to read the data 304 into the system. In the step 102, the system sets a reasoning result error and confidence degree allowable by the user.

The similarity calculating unit 203 executes the step 103 to read one previous case of the data 305 stored in the data file 201 into the system. Next the similarity calculating unit 203 executes the step 104 to calculate similarities of all previous cases stored in the data file 202 in accordance with the Equations (1) and (2).

FIG. 5 shows data 500, an output of the step 104. Lines in the data 500 indicate the values of similarities and output fields of previous cases arranged in a similarity decreasing order. A total number of data is equal to a total number N of previous cases.

Figure 6:
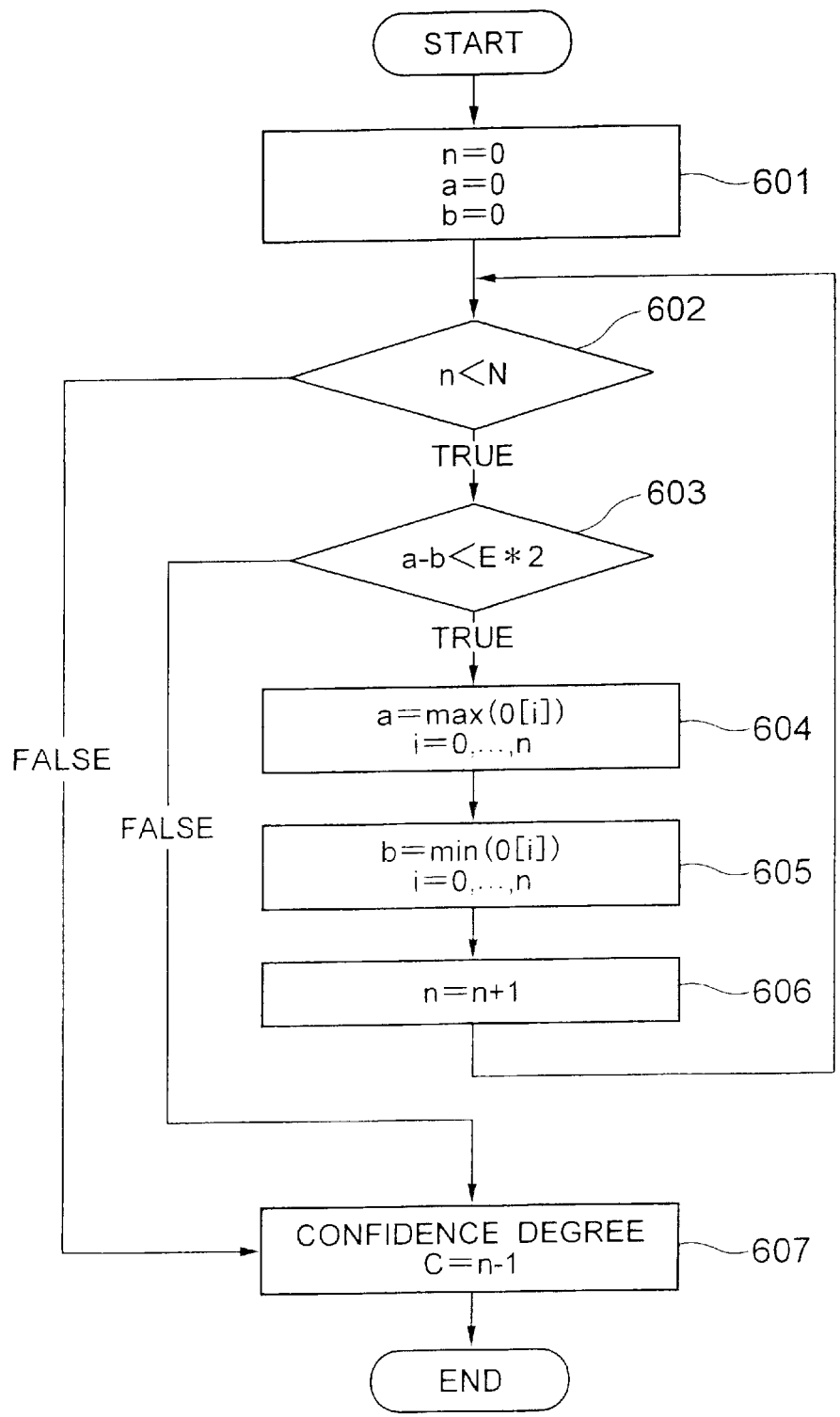
FIG. 6 is a flowchart for explaining a confidence degree calculation procedure in a first embodiment.

The confidence degree calculating unit 205 executes the step 105. In the step 105, the unit 205 calculates a reasoning confidence degree with use of the data 500 and the values of output fields of previous cases having large similarities. Details of the step 105 is shown by a flowchart 600 of FIG. 6.

In a step 601, variables are initialized. In a step 602, a loop condition judgment is carried out to process data 501 on each line basis.

When the loop condition is judged as true in the step 602, a step 603 is executed. n denotes a line number of the data 501 referred to in the loop. For example, when n=0, a line having a similarity of 3.2 is referred to. In the step 603, it is judged whether or not a previous case being referred to satisfies the allowable error. A variable a is maximum one of the values of output fields referred in the loop and a variable b is minimum one thereof. Accordingly, the variables a and b are changed during the repetitive loop from time to time. A variable E indicates the value of the allowable error present in the data 304.

When the allowable error condition is true in the step 603, a step 604 is executed. The parameter a is updated in the step 604 and the b is updated in a step 605. An array O[i] is the value of an i-th output field in the data 501. In a step 606, a loop counter n is updated.

When the loop condition of the step 602 is false, or when the condition of the step 602 is false, a step 607 is executed. In the step 607, a confidence degree C is determined and C=n−1 is set.

It is assumed that, after the step 607 is executed, the reasoning result calculating unit 204 executes the step 106. In the present embodiment, the confidence degree C determined in the step 607 indicates the number of previous cases used as similar cases. In the step 106, a reasoning result is determined in accordance with the Equation (3) with use of upper C ones of the cases having large similarities in the data 501. The output unit 206 executes the step 107 and outputs the reasoning result and confidence degree.

In the condition judgment of a step 108, it is judged whether or not all the new cases in the data file 201 has been processed. When the condition is false, the operation is repeated starting with the step 103. When the condition is true, the reasoning operation is terminated.

In this way, The first embodiment is featured in that, when previous cases having the values of their output fields falling in a specific range are employed as similar cases, suitable similar cases can be selected even when a case distribution is not uniform, and further in that, when the number of selected similar cases is used as a reasoning confidence degree.

Explanation will next be made as to a second embodiment of the present invention. The second embodiment is different from the first embodiment in the step 105 as the confidence degree calculation steps. Data 306 in place of the data 304 is used as a reasoning parameter, and data 402 is used as output data.

In the present embodiment, the number of used similar cases, allowable error and confidence degree in the data 306 are set as reasoning parameters. The allowable error is similar to that in the data 304. However, the second embodiment is different from the first embodiment in that the confidence degree in the present embodiment indicates a ratio of the number of the cases satisfying the allowable errors with respect to the employed similar cases.

The output data 402 indicates the reasoning result and confidence degree. Given the data 306, a confidence degree of 0.9 means that 18 of 20 similar cases have output field values satisfying the allowable errors.

Figure 7:
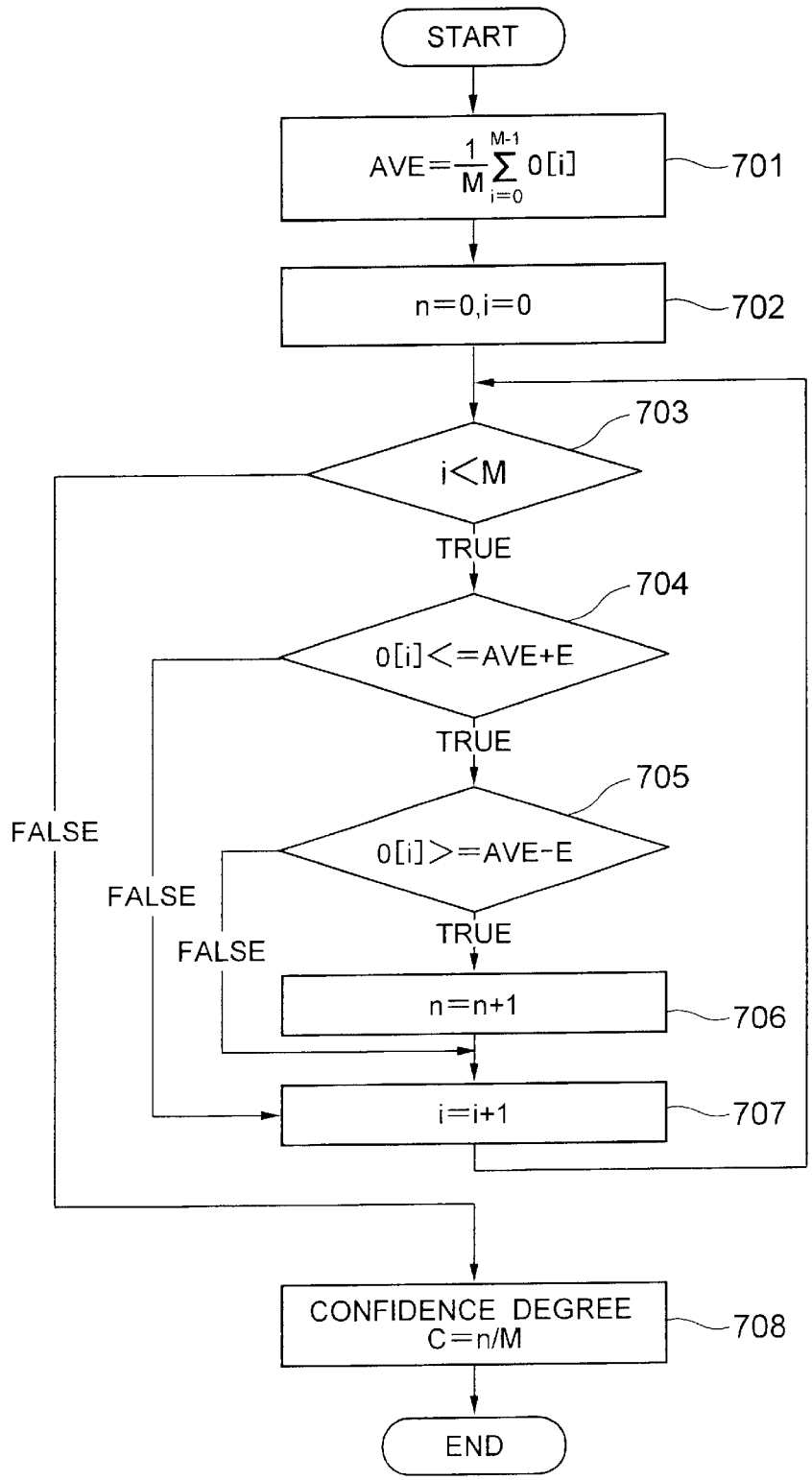
FIG. 7 is a flowchart for explaining a confidence degree calculation procedure in a second embodiment.

Details of the step 105 in the present embodiment is shown by a flowchart 700 in FIG. 7. In a step 701, the values of output fields of previous cases employed as similar cases are averaged to an average and the average is substituted into a variable AVE. A variable M is the number of similar cases set in the data 306. In the present embodiment, the number of similar cases is given as a parameter, so that, when upper M ones of similar cases having large similarities are acquired from the data 501, the values of output fields of such similar cases can be obtained.

In a step 702, a counter variable is initialized. In a step 703, loop condition judgement is carried out to refer to similar cases on each similar case basis.

When the loop condition in the step 703 is true, a step 704 is executed. In the steps 704 and 705, it is judged whether or not the output field value O[i] of similar cases being referred to is not smaller than an average AVE−E and also falls in an allowable error range not larger than AVE+E. When the output field value O[i] is in the allowable range, a variable n is counted up in a step 706. In a step 707, the loop counter is counted up.

When the loop condition of the step 703 is false, the step 707 is executed to determine the confidence degree C.

In this way, the present embodiment is featured by calculating a reasoning confidence degree with use of the range of output field values of similar cases and the number of cases falling in the allowable errors.

Explanation will then be made as to a third embodiment. The present embodiment is different from the first embodiment in that the values of output fields of cases are non-numeric values and the confidence degree calculation step of the step 105 and the reasoning result calculation step of the step 106 in FIG. 1 are different from those in the present embodiment. However, since the input fields are treated similarly, this will not affect the other processing.

Figure 8:
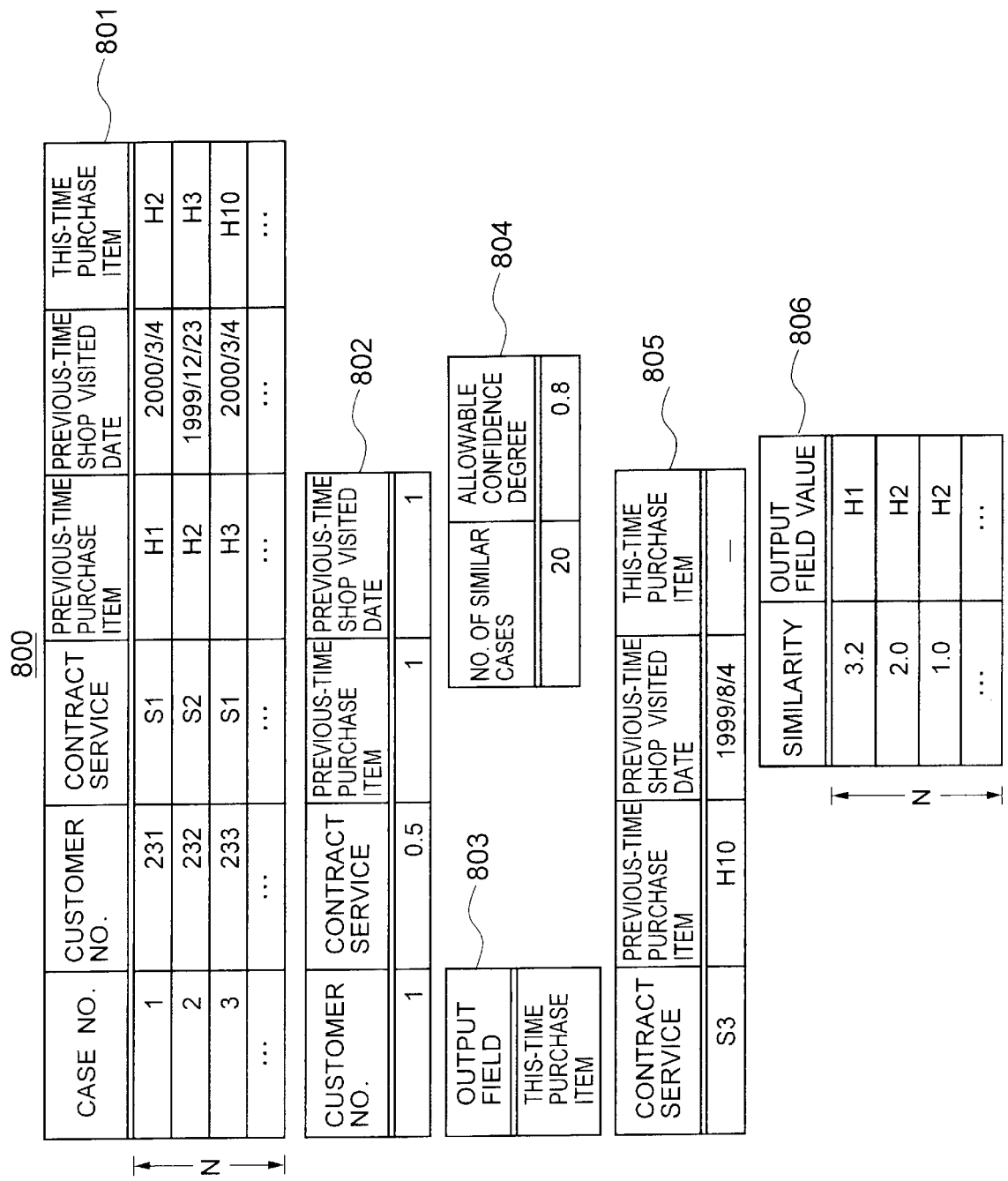
FIG. 8 shows examples of input data and data processed by a confidence degree calculation module in a third embodiment.

Input data given in the present embodiment are shown in FIG. 8.

Data 801 are N previous cases, data 802 are input field settings, data 803 is an output field setting, data 804 are reasoning parameters, and data 805 are previous cases. The reasoning parameters 804 are different from those in the first embodiment. Data 806 indicate an output of the similarity calculating unit 203.

In the present embodiment, when the output fields are non-numeric values such as 'same-day purchase item', non-numeric field values such as items H1 and H2 are previously classified into several categories. The total number of such categories is only required to be not larger than the total number of types of field values. For example, when the number of categories is set at 3, classification is previously made so that the items H1 and H2 belong to the first category value, items H3, H4 and H5 belong to the second category value, and the other items belong to the third category value. In this connection, however, the number of categories to which an i-type field value belongs must be always 1.

A target of the reasoning of the present embodiment is to calculate the most likely category when there is a new case whose output field is of a non-numeric value type.

The data 804 indicates that the number of similar cases employed as well as its allowable confidence degree are set as the reasoning parameters. In this connection, if the number of similar cases for a new case is denoted by M and the number of ones of the similar cases belonging to the most likely category is denoted by m, then the confidence degree in the present embodiment is given by m/M.

Figure 9:
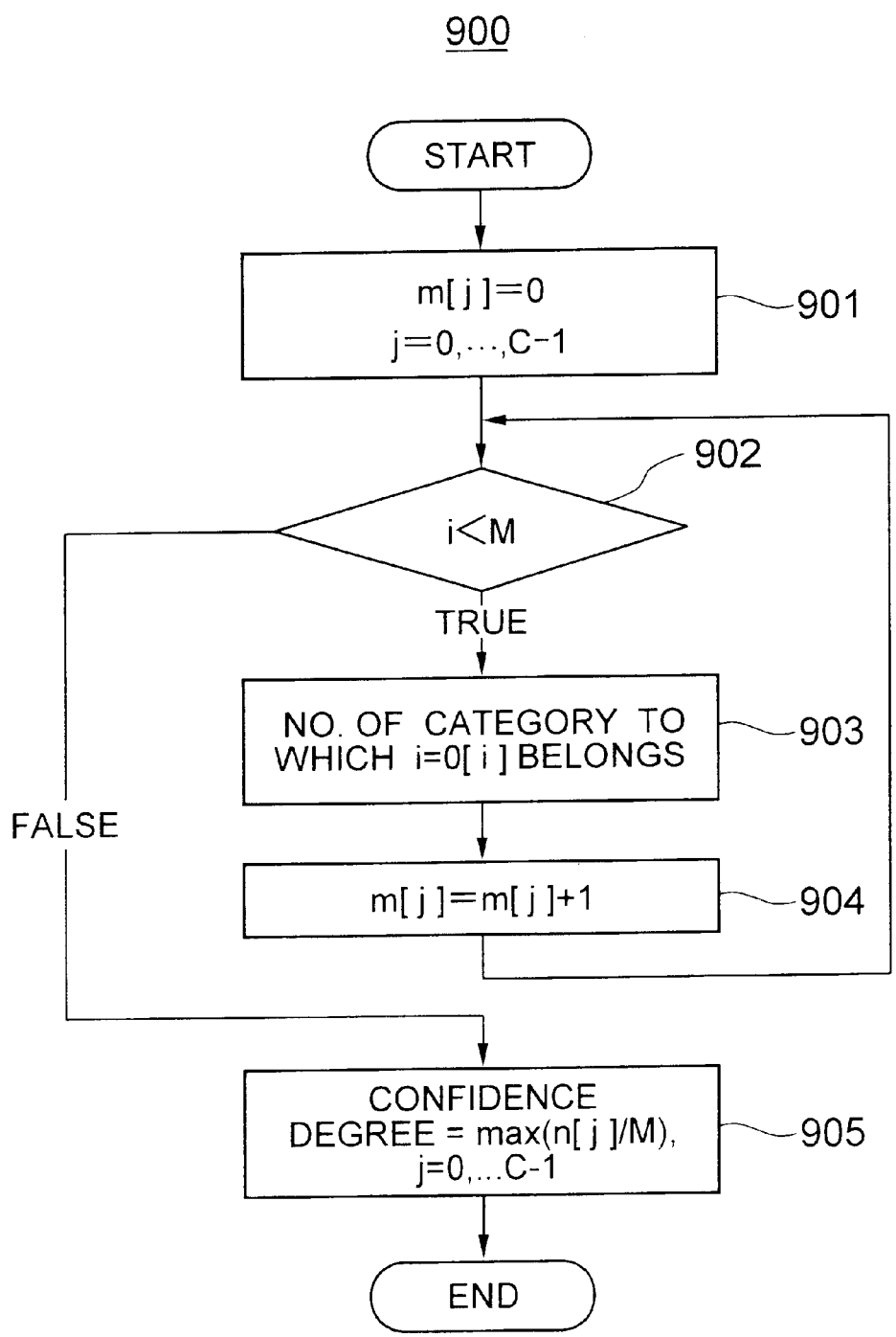
FIG. 9 is a flowchart for explaining a confidence degree calculation procedure in the third embodiment.

Details of the step 105 in the present embodiment is shown by a flowchart 900 in FIG. 9. The step 105 includes steps 901, 902, 903, 904 and 905 in the flowchart 900. In the step 901, an array m[i] is initialized. In the step 902 and subsequent steps, the number of similar cases belonging to the j-th category is stored in the array m[j]. When the number of categories is denoted by C, j is an integer not smaller than 0 and less than C. A variable M is the number of similar cases set in the data 804. In the present embodiment, the number of similar cases is given by a parameter, so that, when the upper M ones of the similar cases having large similarities are acquired from the data 501, the output field values of the similar cases can be obtained.

In the step 902, loop condition judgement is carried out to refer to the similar cases one after another. In the step 903, the variable j indicative of a category is set, and corresponds to the number of the category to which O[i] belongs. In the step 904, the number of ones of the similar cases belonging to the j-th category is counted up.

In the step 905, a confidence degree is calculated. One of the categories to which the most similar cases belong is selected, and a ratio of the number of cases belonging to the category with respect to the total number M of the similar cases is used as the confidence degree.

In the step 106 after completion of the step 105, the category used upon the above calculation is selected as a reasoning result.

Data 403 indicates output data in the present embodiment. The data 403 means that the reasoning result of 'current-time purchase item' in the new case belongs to 'category 1', and the confidence degree thereof is 0.8

The present embodiment is featured in that, when the output field is of a non-numeric value type in this way, the number of similar cases belong to a category is used as a confidence degree.

Figure 10:
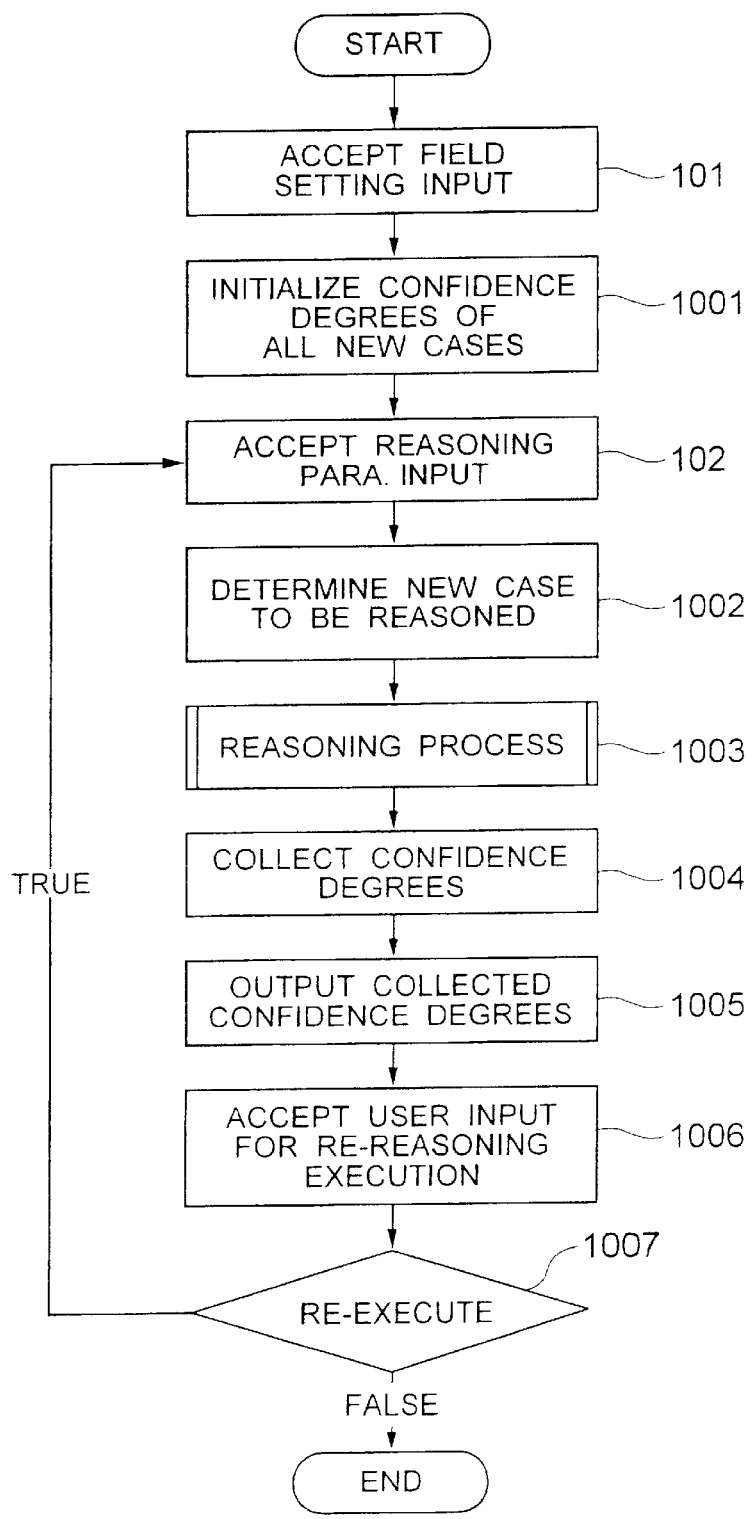
FIG. 10 is a flowchart for explaining a processing procedure in a fourth embodiment.

Explanation will next be made as to a fourth embodiment of the present invention. FIG. 10 shows a flowchart of the fourth embodiment. Steps 101 and 102 are similar to those in FIG. 1, and a step 1003 includes the steps 103, 104, 105, 106 and 107 in FIG. 1. Further, the data 304 is used as the reasoning parameter as in the first embodiment.

In the present embodiment, when reasoning is carried out for two or more new cases, there is provided a means for selecting such new cases as not to satisfy an allowable confidence degree and repeating the reasoning operation while changing the reasoning parameter.

Figure 11:
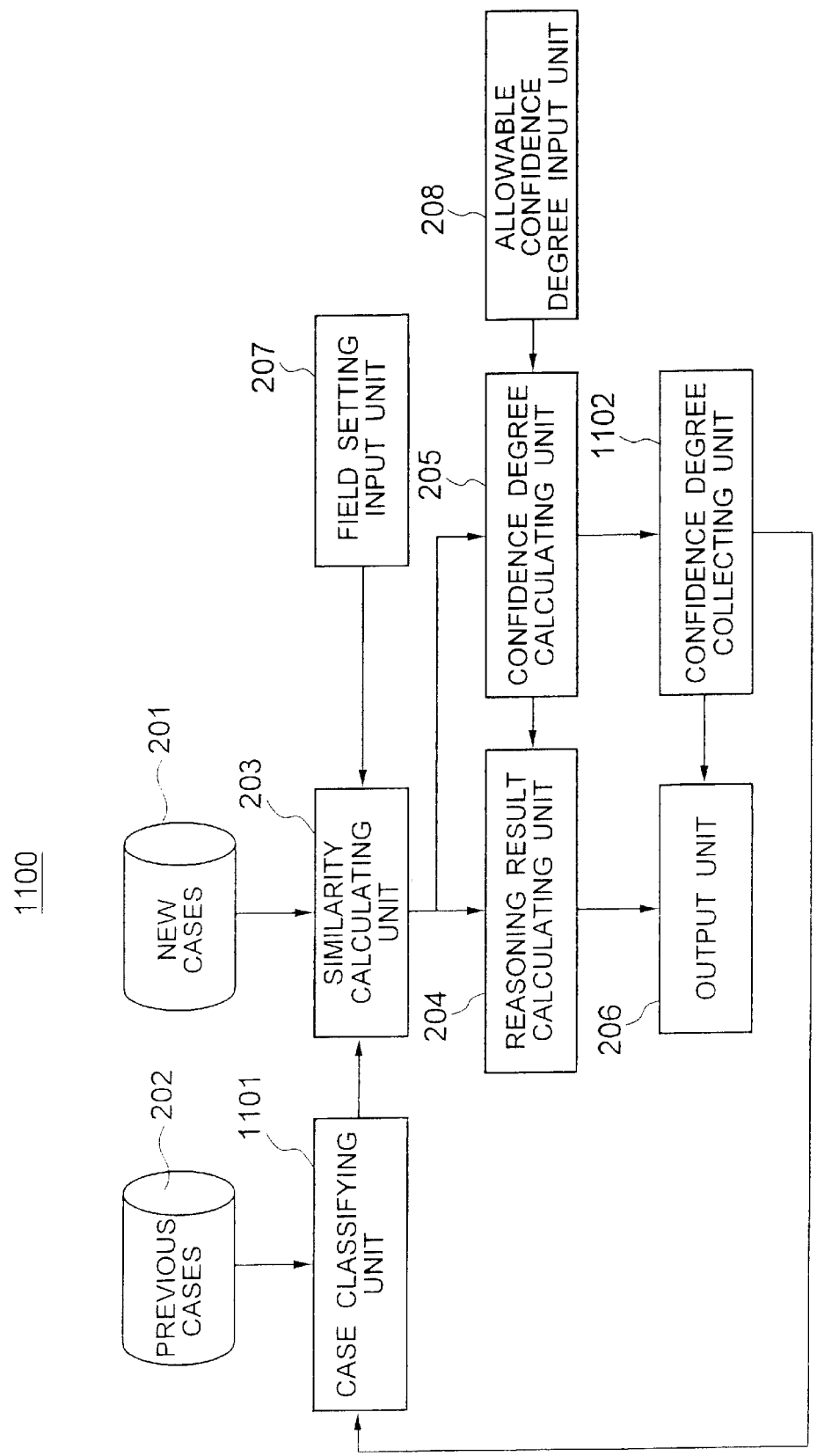
FIG. 11 shows data flows between modules to realize the fourth embodiment.

FIG. 11 shows data flows between modules in the present embodiment. Units 201, 202, 203, 204, 205, 206, 207 and 208 in FIG. 11 are substantially the same as those in FIG. 2. A case classifying unit 1101 selects new cases to be reasoned, while a confidence degree collecting unit 1102 collects confidence degrees of a plurality of reasoning results.

In a step 1001, the confidence degrees of the new cases are initialized at 0. As a result, in the step 102 and subsequent steps, all the new cases are reasoned in the first reasoning operation and only a specific case is reasoned in the second and subsequent repeated reasoning operations. In a step 1002, the case to be reasoned is determined. In the repeated second and subsequent operations, the case that does not satisfy conditions, which will be explained below, is reasoned.

In the step 1002, the cases that do not satisfy conditions, that is, condition-unsatisfied cases are selected. In a step 1003, the confidence degrees and reasoning results of all the new cases are calculated, a step 1004 is executed by the confidence degree collecting unit 1102 to collect the confidence degrees.

Data 1201 in FIG. 12 indicates a processed result of the step 1004. A condition-satisfied case refers to a new case that satisfies the allowable error and allowable confidence degree as reasoning parameters, that is, a new case whose similar cases have output field values not larger than the allowable error and whose similar cases are larger in number than a value specified by the allowable confidence degree. A condition-unsatisfied case is a new case that does not satisfy an allowable error or allowable confidence degree. In the step 1004, with respect to each of the condition-unsatisfied and condition-satisfied cases, an average of the numbers of cases, an average of confidence degree, and an average of errors are calculated. In a step 1005, a processed result of the step 1004 is output. In a step 1006, with respect to the condition-unsatisfied case, it is inquired whether or not its reasoning parameter is to be changed for re-execution of the reasoning.

In this way, the present embodiment is featured by provision of a means for selectively re-reasoning new cases that do not satisfy the reasoning error and confidence degree set as the reasoning parameters.

In the case of the re-reasoning, it is possible for the user to interactively change the reasoning parameters while looking at the states of the condition-satisfied and condition-unsatisfied cases. It is also possible to previously prepare a parameter set for use in the re-reasoning and to carry out the re-reasoning automatically without demanding that the user conducts interactive operations. Data 1300 in FIG. 13 indicates a parameter set wherein parameters in lines are used in the re-reasoning. For example, in the first reasoning, the allowable error is 100 and the allowable confidence degree is 10. In the second reasoning, similarly, the allowable error is 120 and the allowable confidence degree is 10.

In accordance with the present invention, even when a case distribution is not uniform in the reasoning based on case similarity, suitable reasoning results can be obtained and such suitable confidence degrees as to be able to judge the validity of the reasoning results can be obtained.

What is claimed is:

1. A method for calculating a confidence degree as a degree of certainty in reasoning with use of similarities between cases of a record type including at least two fields, the method being implemented by a computer system and the cases being stored in a database, the method comprising the steps of:

setting at least one input field for use in calculation of the similarities between the cases and at least one output field to be an object of the calculation of a reasoning result;

inputting parameters relating to the similarity calculation including an allowable value of a reasoning error;

inputting a new case having at least one output field having an unknown value;

calculating similarities between said new case and previous cases already stored for each of the previous cases;

generating a distribution of the output fields by referring to values of the output fields of the previous cases in a decreasing order of said similarities;

comparing said distribution with said allowable value to calculate a confidence degree in the reasoning;

calculating a reasoning result of the output field value of the new case with use of the output field values of the previous cases and said calculated similarities; and outputting said reasoning result and said confidence degree.

2. A reasoning method as set forth in claim 1, wherein the parameter relating to said similarity calculation has a value indicative of a fluctuation in an allowable reasoning result and has a lower limit value of the number of similar cases in the previous cases for use in calculation of one reasoning result, and the confidence degree is a number of previous cases which output field values that are within the fluctuation in an allowable reasoning result.

3. A reasoning method as set forth in claim 1, wherein the parameter relating to said similarity calculation has a value indicative of a fluctuation in an allowable reasoning result, a number of similar cases in the previous cases for use in calculation of one reasoning result, and a lower limit value of a ratio between the number of the similar cases not exceeding the fluctuation of said allowable reasoning result and the number of the similar cases for use in the one reasoning result, and the confidence degree is the ratio between the number of similar cases not exceeding the fluctuation of said allowable reasoning result and the number of the similar cases for use in the one reasoning result.

4. A reasoning method as set forth in claim 1, wherein the parameter relating to said similarity calculation has a lower limit value of the number of similar cases of the previous cases for use in one reasoning result and has a value for restriction of the distribution of the similar cases.

5. A method for calculating a confidence degree as a degree of certainty in reasoning with use of similarities between cases of a record type including at least two fields, the method being implemented by a computer system and the cases being stored in a database, the method comprising the steps of:

(a) setting at least one input field for use in calculation of the similarities between the cases and at least one output field to be an object of the calculation of a reasoning result;

(b) inputting parameters relating to the similarity calculation including an allowable value of a reasoning error and an allowable confidence degree, the confidence degree being a number of previous cases satisfying a condition of the reasoning error;

(c) inputting a new case having at least one output field having an unknown value;

(d) calculating similarities between said new case and previous cases already stored for each of the previous cases;

(e) generating a distribution of the output fields by referring to values of the output fields of the previous cases in a decreasing order of said similarities;

(f) comparing said distribution with said allowable value to calculate the confidence degree in the reasoning;

(g) calculating a reasoning result of the output field value of the new case with use of the output field values of the previous cases and said calculated similarities; and (h) judging whether or not to repeat said steps (b) to (g) on the basis of output results of said reasoning result and said confidence degree.

6. A reasoning method for finding a reasoning result on the basis of similarities between cases of a record type including at least two fields, the method being implemented by a computer system and the cases being stored in a database, the method comprising the steps of:

setting at least one input field having a value already set and at least one output field as an object to be reasoned;

inputting a reasoning parameter to find a reasoning confidence degree;

inputting a new case having at least one output field having an unknown value;

calculating similarities of previous cases for said new case on the basis of the value of said input field;

generating a distribution of values of the output fields of the previous cases selected on the basis of said similarities;

calculating a reasoning confidence degree on the basis of said distribution and said reasoning parameter;

calculating a reasoning result for the value of the output field of the new case on the basis of the values of the output fields of said selected previous cases and similarities; and outputting said reasoning result and said confidence degree.

7. A reasoning system for finding a reasoning result on the basis of similarities between cases of a record type including at least two fields, the cases being stored in a database, the system comprising:

means for setting at least one input field having a value already set and at least one output field as an object to be reasoned;

means for inputting a reasoning parameter to find a reasoning confidence degree;

means for inputting a new case having at least one output field having an unknown value;

means for calculating similarities of previous cases for said new case on the basis of the value of said input field;

means for generating a distribution of values of the output fields of the previous cases selected on the basis of said similarities;

means for calculating a reasoning confidence degree on the basis of said distribution and said reasoning parameter;

means for calculating a reasoning result for the value of the output field of the new case on the basis of the values of the output fields of said selected previous cases and said similarities; and means for outputting said reasoning result and said confidence degree.

8. A reasoning method for finding a reasoning result on the basis of similarities between cases of a record type including at least two fields, the method being implemented by a computer system and the cases being stored in a database, the method comprising the steps of:

calculating similarities between a new case having at least one output field having an unknown value and previous cases based on input fields already set with values;

calculating a reasoning confidence degree on the basis of a distribution of values of output fields of the previous cases selected based on said similarities and a previously-input reference value;

calculating a reasoning result of the value of the output field of the new case on the basis of the values of the output fields of said selected previous cases and said similarities; and outputting said reasoning result and said confidence degree.

9. A reasoning method for finding a reasoning result on the basis of similarities between cases of a record type including at least two fields, the method being implemented by a computer system and the cases being stored in a database, the method comprising the steps of:

calculating similarities between a new case having at least one output field having an unknown value and previous cases having all fields already set with values using input fields already set with values of the new and previous cases;

selecting some of the previous cases in accordance with the calculated similarities; and calculating a reasoning result of the value of the output field of the new case on the basis of the values of the output fields of the selected previous cases and said calculated similarities.

* * * * *